Patented July 11, 1933

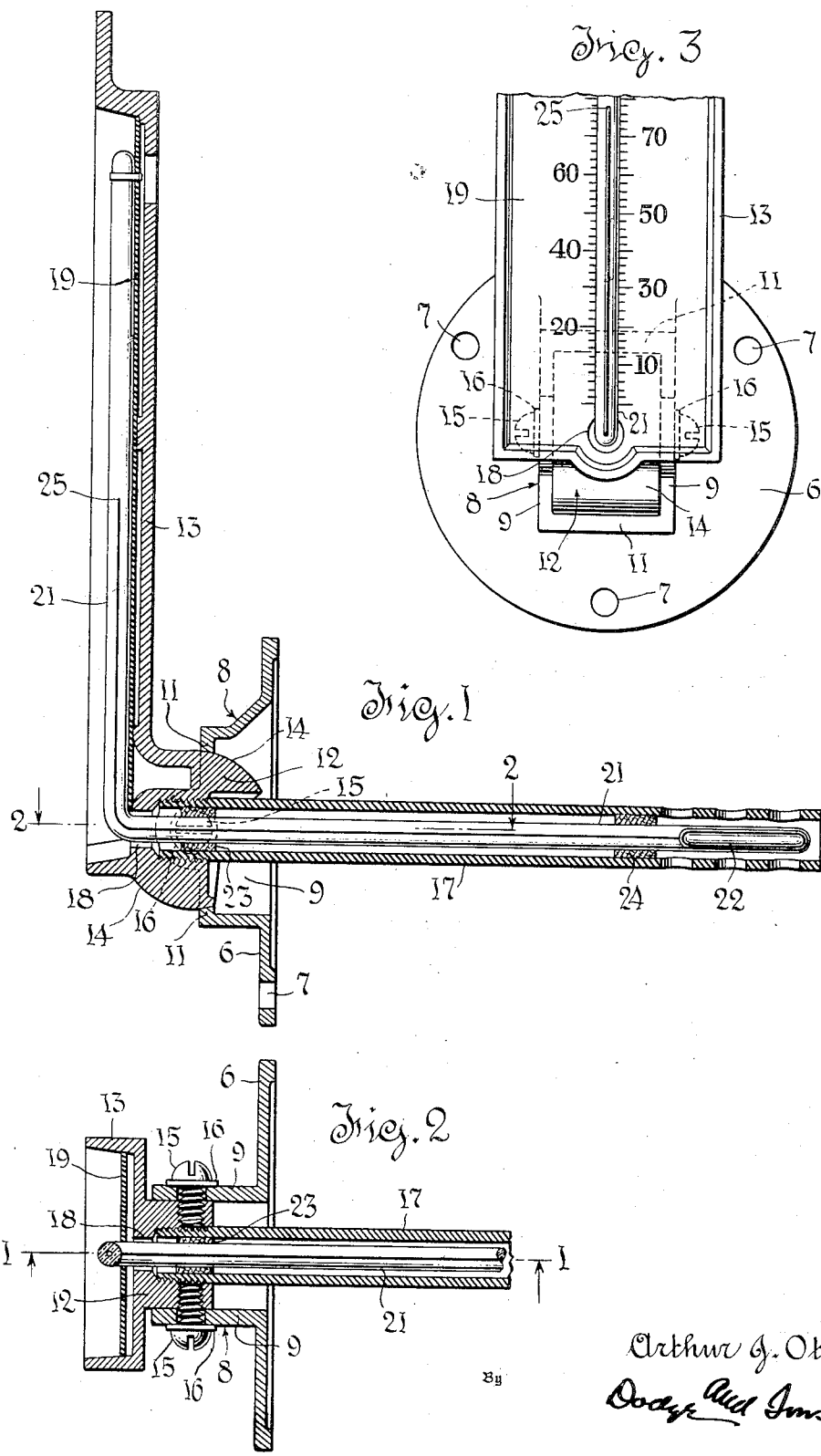

1,917,457

UNITED STATES PATENT OFFICE

ARTHUR J. OTTO, OF MILWAUKEE, WISCONSIN, ASSIGNOR TO JOHNSON SERVICE COMPANY, OF MILWAUKEE, WISCONSIN, A CORPORATION OF WISCONSIN

THERMOMETER

Application filed April 6, 1932. Serial No. 603,631.

This invention relates to thermometers, and particularly to what are known as insertion thermometers.

An insertion thermometer is one which has a bulb portion inserted through a wall into a duct or chamber, and a graduated scale portion read from that side of the wall remote from the bulb.

It is at times necessary to mount such thermometers in inaccessible positions, for example, on the side of an air duct high above the floor. The object of the present invention is to afford a reasonable degree of adjustability, which will permit the thermometer to be tilted to an angle at which it may be read conveniently and without errors caused by parallax.

A preferred form of the invention, as applied to an angular thermometer is illustrated in the accompanying drawing, in which, Fig. 1 is a vertical section through the complete device on the line 1—1 of Fig. 2.

Fig. 2 is a fragmentary horizontal section on the line 2—2 of Fig. 1.

Fig. 3 is a fragmentary front elevation.

In the drawing 6 represents a base intended to be mounted over an aperture in a wall or partition (not shown) and to be held in place by fastenings passing through the holes 7.

At the center of the base 6 is an apertured forward projection, indicated generally at 8, and having parallel side walls 9 and top and bottom flanges 11. Fitting closely and filling the space between the side walls 9 is a boss 12, formed at the lower end of the mount 13. The boss 12 is formed with opposed arcuate portions 14 and is supported on trunnion screws 15 concentric with the arcuate portions 14. The arcuate portions 14 form a substantially tight seal with the flanges 11.

The screws 15 pass through washers 16 and holes in the walls 9 and are threaded into the boss 12. They may be tightened more or less, as desired, to hold the boss against tilting.

Threaded into the rear of boss 12 is an apertured tube 17, which projects to the rear and forms a continuation of a hole 18 through boss 12.

The mount 13 is recessed at the front and in this recess is positioned a graduated thermometric scale 19.

An ordinary liquid thermometer having a tube 21 of angular form and a bulb 22 is so mounted that a portion of the tube 21 overlies the scale 19 and the remainder extends through hole 18 and tube 17, terminating in bulb 22 which is completely housed in the tube.

A sleeve 23 of flexible packing material, such as cotton wicking, cushions the tube 21, and resists air flow through hole 18. A similar sleeve 24 supports and cushions the end of the tube near the bulb.

The end of the liquid column is indicated at 25 and is read against scale 19, as will be obvious.

The thermometer chosen for illustration may be tilted outward on a horizontal axis through an angle of 45° or so. The angle of adjustment permitted may be made greater if desired. It is not necessary that the thermometer tube be bent at a right angle, as shown, or at any angle. Obviously the insertion portion 17 and mount 13 might have various angular relations to which, of course, the thermometer tube must conform.

What is claimed is:

1. The combination of an apertured base; a thermometer extending through the aperture in said base; a hinged connection between said thermometer and base on an axis transverse to the thermometer; and means moving with the thermometer and substantially filling the aperture in the base to maintain the aperture closed in the various adjusted positions of the thermometer.

2. The combination of an apertured base; a thermometer, having a rigid tube extending through the aperture in said base; a hinged connection between said thermometer and base on an axis transverse to the thermometer tube; and means carried by the base for clamping the thermometer to the base in adjusted angular positions.

3. The combination of an apertured base; a thermometer extending through the aperture in said base; a hinged connection between said thermometer and base on an axis transverse to the thermometer; means moving with the thermometer and substantially filling the aperture in the base to maintain the aperture closed in the various adjusted positions of the thermometer; and means for clamping the thermometer in adjusted positions.

4. The combination of an apertured base; a thermometer mount hinged thereto on an axis transverse to the mount, said mount including a scale portion, and an insertion portion which extends through the aperture in said base and beyond the base; and a thermometer including a stem and bulb mounted in said mount with its stem in coactive relation with said scale portion and its bulb housed in said insertion portion.

5. The combination of an apertured base; a thermometer mount hinged thereto on an axis transverse to the mount, said mount including a scale portion, and an insertion portion which extends through the aperture in said base and beyond the base; a thermometer including a stem and bulb mounted in said mount with its stem in coactive relation with said scale portion and its bulb housed in said insertion portion; and means coacting between said base and mount to maintain the aperture in the base closed in all positions of the mount.

6. In a thermometer, the combination of an apertured base; a thermometer mount hinged thereto on an axis transverse to the mount, said mount including a scale portion and an insertion portion at an angle thereto, the hinged connection with the base being adjacent the junction of the two portions, and the insertion portion extending through the aperture in the base; and a thermometer including a tube and bulb and having its tube bent at an angle, said thermometer being mounted in said mount with its tube in coactive relation with said scale portion and its bulb housed in said insertion portion.

7. In a thermometer, the combination of an apertured base; a thermometer mount hinged thereto on an axis transverse to the mount, said mount including a scale portion and an insertion portion at an angle thereto, the hinged connection with the base being adjacent the junction of the two portions, and the insertion portion extending through the aperture in the base; a thermometer including a tube and bulb and having its tube bent at an angle, said thermometer being mounted in said mount with its tube in coactive relation with said scale portion and its bulb housed in said insertion portion; and means coacting between said base and mount, to maintain the aperture in the base closed in all adjusted positions of the mount.

8. In a thermometer, the combination of an apertured base; a thermometer mount hinged thereto on an axis transverse to the mount, said mount including a scale portion and an insertion portion at an angle thereto, the hinged connection with the base being adjacent the junction of the two portions, and the insertion portion extending through the aperture in the base; a thermometer including a tube and bulb and having its tube bent at an angle, said thermometer being mounted in said mount with its tube in coactive relation with said scale portion and its bulb housed in said insertion portion; means coacting between said base and mount, to maintain the aperture in the base closed in all adjusted positions of the mount; and means for clamping said mount to said base in adjusted positions.

In testimony whereof I have signed my name to this specification.

ARTHUR J. OTTO.